3,452,068
GROUP VIII METAL THIOCARBONYL
COMPOUNDS
Geoffrey Wilkinson, London, England, assignor to Ethyl Corporation, New York, N.Y., a corporation of Virginia
No Drawing. Filed Dec. 14, 1966, Ser. No. 601,531
Claims priority, application Great Britain, Apr. 12, 1966, 16,021/66
Int. Cl. C07f *15/00;* C23c *17/02*
U.S. Cl. 260—429                                                11 Claims

ABSTRACT OF THE DISCLOSURE

Group VIII metal thiocarbonyl triaromatic phosphines are prepared by reacting a Group VIII metal halide tris(triaromatic phosphine) with a sulfur compound which is a source of thiocarbonyl radicals. The novel compounds prepared are useful as catalysts, chemical intermediates, and metal plating compounds.

---

The instant invention relates to transition metal thiocarbonyls and the process for preparing same.

Although transition metal carbonyl compounds are well known in the art, and a great variety of them have been prepared in the past by various processes, no transition metal thiocarbonyl compounds have been reported. Unexpectedly, however, I succeeded in preparing novel thiocarbonyl compounds by the process of this invention.

The object of this invention is to provide novel transition metal thiocarbonyl compounds. Another object is to provide a process for preparing said compounds. Still other objects will become apparent from the following detailed description.

The above and other objects are accomplished by providing a process for preparing novel transition metal thiocarbonyl compounds having the general formula:

$$MX_n(CS)_y(PR_3)_z$$
(I)

wherein M is a Group VIII metal, X is an anion, R is an aryl or aralkyl radical having up to about 20 carbon atoms, $n$ and $y$ are integers independently selected from 1, 2, and 3, and $z$ is an integer from 2 to 6.

The above-mentioned novel compounds may be prepared by a process comprising reacting an organometallic compound of a suitable metal with a sulfur-containing compound which is a source of thiocarbonyl radicals, $>C=S$. More specifically, the process comprises refluxing a Group VIII metal halide tris(triarylphosphine) or tris(triaralkylphosphine) having the general formula $MX_n(PR_3)_3$, wherein M, X, R and $n$ are as described above, with compounds such as carbon disulfide. The compounds of this invention may contain any Group VIII metal (that is, iron, cobalt, nickel, ruthenium, rhodium, palladium, osmium, iridium, and platinum). However, the compounds containing ruthenium and rhodium are preferred.

In the moiety ‑(PR₃) in the above general formula, R may be aryl, such as phenyl, or an aralkyl group having up to 20 carbon atoms. When aralkyl groups are present, the only limitation that must be observed is that at least one ortho position must not be substituted. That is, a replaceable hydrogen atom must be present in at least one ortho position on the ring. Thus, illustrative examples of aralkyl groups that may be present in the abovementioned ‑(PR₃)z moiety are o, m, or p-tolyl, 2,3-dimethylphenyl, 2,4-dipropylphenyl, 3,5-dihexylphenyl, 2,3,4-tributylphenyl, 1,2,3,4-tetraethylphenyl, 3-ethyl-5-octylphenyl, and the like. Even though it is preferred that the moiety represented by ‑(PR₃) be a phosphine, this moiety may also be stibine or arsine, respectively ‑(AsR₃) and ‑(SbR₃), wherein the R groups are the same as in the phosphine moieties described above.

The novel compounds of this invention represented by the above general formula also contain anions. Although halogens in general, and chlorine and bromine in particular, are preferred, other anions may also be present. Illustrative examples of anions other than halogens are sulfate, sulfite, hydroxide, phosphate, phosphite, nitrate, nitrite, cyanide, carbonate, acyloxy, and the like.

Illustrative but non-limiting examples of my novel compounds are bis(triphenylphosphine)(thiocarbonyl)chloro-
  rhodium(I),
bis(triphenylphosphine)(thiocarbonyl)bromo-
  rhodium(I),
bis(triphenylhposphine)(thiocarbonyl)tribromo-
  rhodium(III),
bis(triphenylphosphine)(thiocarbonyl)
  trichlororodium(III),
bis(triphenylphosphine)(thiocarbonyl)chloro-
  ruthenium(I),
bis(triphenylphosphine)(thiocarbonyl)
  bromoruthenium(I),
bis(triphenylphosphine)(thiocarbonyl)tribromo-
  ruthenium(III),
bis(triphenylstibine)(thiocarbonyl)
  nitratorhodium(I),
bis(triphenylstibine)(thiocarbonyl)(hydrogensulfato)
  rhodium,
bis[tri(2,3-dimethylphenyl)arsine](thiocarbonyl)
  tricyanido)(ruthenium)(III), and the like.

As mentioned above, the process of this invention, whereby the novel organometallic thiocarbonyl compounds are prepared, comprises heating the starting material with a sulfur-containing compound which is a source of $>CS$ groups. The starting material can be any Group VIII metal anion tris(triarylphosphine) or tris(triaralkylphosphine) as defined above. Illustrative but non-limiting examples of the starting materials that may be employed in the process of this invention are tris(trisphenylphosphine)chlororhodium(I),
tris(triphenylphosphine)trichlororhodium(III),
tris(triphenylphosphine)dichlororuthenium,
tris(triphenylphosphine)bromorhodium(I),
tris(triphenylphosphine)tribromorhodium(III),
tris(triphenylphosphine)dichlororuthenium,
tetrakis(triphenylphosphine)dichlororuthenium,
tris(tritolylphosphine)chlororhodium(I),
tris[tris(2,4-diethylphenyl)stibine]chlororhodium(I),
tris[tris(2,3,4-trimethylphenyl)stibine]nitrato-
  rhodium(I),
tris[tris(3-hexyl-4-ethylphenyl)arsine]
  tricyanidoruthenium(III),
bis[tris(triphenylarsine)ruthenium(I) sulfate, and the like.

The most preferred source of $>CS$ is carbon disulfide which also acts as a reaction medium. However, other sources of $>CS$ groups may also be employed such as thiophosgene, thiobenzoyl chloride, thiocarbonyl chloride, and the like. To obtain best results, the carbon disulfide source should be in excess of the organometallic starting material. Outside of this preferred embodiment, it is not critical how much of this material is used, although a ratio of 1 to 20 of organometallic material to the thiocarbonyl source was found to be advantageous.

Although solvents are generally not necessary, solvents which do not interfere with the reaction, or react with the reactants, may be employed. Examples of solvents useful in this process are aromatic hydrocarbons such as benzene, toluene, xylene, and the like, chlorinated paraffins such as carbon tetrachloride, chloroform, methylene chloride, methylene bromide, ethylene dichloride, trichloroethylene, and the like. Occasionally, when the thiocarbonyl source has a higher boiling point than desired, it may be advantageously diluted with a selected solvent and thereby depress the boiling point of the reaction mixture to a more acceptable level.

The process is usually carried out under atmospheric conditions and at a temperature which affords a reasonable rate of reaction. Generally, the reaction temperature is between 0° C. and 250° C. More preferably, the temperature is between 25° C. and 100° C., and most preferably, it is at the boiling point of carbon disulfide. Although the reaction is normally carried out at atmospheric pressure, it may also be carried out at reduced pressure.

The reaction is usually completed within one hour; however, in some instances, a longer reaction period may be required. The length of the reaction will depend on the organometallic compound, the compound employed as the source of thiocarbonyl, and on the solvent, if used. It is, therefore, apparent that it is impossible to predict exactly the reaction time in every instance. However, the reaction period is generally not critical.

The product may be recovered by standard methods available in the art. Usually, at the end of the reaction time, the compound acting as the source of thiocarbonyl is removed by evaporation or any other method. The final product is then dissolved in a suitable solvent such as benzene or chloroform from which it may be recrystallized.

In addition to the compounds described above, Group VIII metal thiocarbonyls such as nickel, iron, and cobalt thiocarbonyls may also be prepared. Specific examples of these types of novel compounds are nickel tetrathiocarbonyl, bis(triphenylphosphine)(thiocarbonyl)dicarbonyliron, $(PPh_3)_2Fe(CS)(CO)_2$, bis(triphenylphosphine)bis(thiocarbonyl)carbonyliron, bis(triphenylphosphine)tris(thiocarbonyl)iron, cyclopentadienylbis(thiocarbonyl), and the like. These compounds may be prepared by reacting a triaryl or triaralkyl phosphine, arsine or stibine metal carbonyl compound with carbon disulfide, or any other source of thiocarbonyl. Carbonyl groups, thus, may be successively replaced to give the desired product. In these reactions, it may be advantageous to employ a sulfur acceptor such as mercury.

The following examples are presented to further illustrate the novel compounds of this invention and the process for their preparation. All parts are by weight unless otherwise specified.

Example I

To a reaction flask equipped with a condenser and a stirrer was charged 10 parts of tris(triphenylphosphine)chlororhodium(I) and an excess of carbon disulfide (about 200 ml.). The reaction mixture was refluxed for about 15 minutes after which carbon disulfide was removed by evaporation. The product, bis(triphenylphosphine)(thiocarbonyl)chlororhodium(I), was obtained by recrystallizing the crude residue from benzene. The melting point of the product was 250° C.

Example II

The product obtained in Example I, bis(triphenylphosphine)(thiocarbonyl)chlororhodium(I), was dissolved in 200 ml. of benzene and a stoichiometric amount of chlorine was passed through the reaction mixture. The volume of the solvent was then reduced by evaporation and on cooling the product, tris(triphenylphosphine)trichlororhodium(III) was obtained.

Example III

Ten parts of tris(triphenylphosphine)bromorhodium(I) was reacted according to the procedure described in Example I to yield bis(triphenylphosphine)thiocarbonyl bromorhodium(I).

Example IV

The product obtained in Example III was brominated according to the procedure described in Example II, yielding tris(triphenylphosphine)tribromorhodium(III).

Example V

Following the procedure of Example I, bis(triphenylphosphine)thiocarbonyl tribromorhodium(III) was prepared from tris(triphenylphosphine)tribromorhodium(III).

Example VI

Employing the procedure of Example I, tris(triphenylphosphine)dichlororuthenium was reacted to yield bis(triphenylphosphine)thiocarbonyl chlororuthenium.

Example VII

Employing the procedure of Example I, bis(triphenylphosphine)ruthenium thiocarbonyl bromide was obtained from tris(triphenylphosphine)ruthenium bromide.

Example VIII

Using the procedure of Example I, bis(tritolylphosphine)thiocarbonyl chloropalladium is obtained from tris(tritolylphosphine)chloropalladium.

Similar results are obtained when tris(tritolylphosphine)chloropalladium is replaced with tris[(2,3-dibutyl-4-hexylphenyl)phosphine]chloropalladium and tris(4-decylphenylphosphine)chloropalladium to yield correspondingly bis[(2,3-dibutyl-4-hexylphenyl)phosphine]thiocarbonyl chloropalladium and bis(4-decylphenylphosphine)chloropalladium.

Example IX

Following the procedure of Example I, tris[(m-ethylphenyl)diphenylphosphine]iodoiridium yields bis[(m-ethylphenyl)diphenylphosphine]thiocarbonyl iodoiridium.

Example X

When tris(tritolylphosphine)chlororhodium(I) is reacted according to Example I, bis(tritolylphosphine)thiocarbonyl chlororhodium is obtained.

The novel thiocarbonyl compounds of my invention described above have many utilities. These compounds may be used in metal plating applications. To effect metal plating, the compounds are decomposed in an evacuated space containing the object to be plated. If desirable, the gaseous plating may be carried out in the presence of an inert gas so as to prevent oxidation. My novel compounds may also be used as intermediates in preparing other compounds. Furthermore, the compounds may be used as oxo catalysts, olefin polymerization catalysts, acetylenic polymerization catalysts, or hydroformylation catalysts.

Having fully described the novel compounds of this invention, the processes for their preparation, and the many utilities therefore, it is desired that this invention be limited only within the lawful scope of the appended claims.

I claim:

1. Transition metal thiocarbonyl compounds having the general formula:

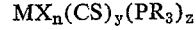

$$MX_n(CS)_y(PR_3)_z$$

wherein M is a Group VIII metal, X is an anion, R is a hydrocarbon radical selected from the group consisting of aryl and aralkyl radicals having up to 20 carbon atoms, $n$ and $y$ are integers independently selected from 1, 2, and 3, and $z$ is an integer from 2 to 6.

2. The compounds of claim 1 wherein M is selected from the group consisting of ruthenium and rhodium.

3. The compounds of claim 1 wherein X is a halogen.

4. The compounds of claim 1 wherein R is a phenyl radical.

5. The compounds of claim 1 wherein M is selected from the group consisting of ruthenium and rhodium, X is selected from the class consisting of chlorine and bromine, and R is a phenyl radical.

6. A process for preparing the compounds of claim 1, said process comprising reacting a compound having the formula $$MX(PR_3)_3$$

wherein M is a Group VIII metal, X is an anion, and R is a hydrocarbon radical selected from the group consisting of aryl and alkaryl radicals having up to about 20 carbon atoms, with a sulfur-containing compound capable of releasing thiocarbonyl radicals.

7. A process of claim 6 wherein M is selected from the group consisting of ruthenium and rhodium.

8. The process of claim 6 wherein X is a halogen.

9. A process of claim 6 wherein R is a phenyl radical.

10. A process of claim 6 wherein said sulfur-containing compound is carbon disulfide.

11. A process of claim 6 wherein M is selected from the group consisting of ruthenium and rhodium, X is selected from the group consisting of chlorine and bromine, and R is a phenyl radical, and said sulfur-containing compound is carbon disulfide.

References Cited

Baird et al.: Chem. Comm. (1966), pp. 267–8.
Vaska: Abstract of Papers, 151st Meeting Am. Chem. Soc., March 1966, p. 79.

TOBIAS E. LEVOW, *Primary Examiner.*

A. P. DEMERS, *Assistant Examiner.*

U.S. Cl. X.R.

117—107.2; 252—429, 431; 260—439